Sept. 11, 1945.   K. F. RUSSELL ET AL   2,384,699
AIR CLEANER
Filed Jan. 23, 1943   2 Sheets-Sheet 1

INVENTORS
KENNETH F. RUSSELL
GEORGE H. HOPKINS
BY
HARRIS, KIECH, FOSTER & HARRIS
FOR THE FIRM
ATTORNEYS.

Sept. 11, 1945.  K. F. RUSSELL ET AL  2,384,699
AIR CLEANER
Filed Jan. 23, 1943  2 Sheets-Sheet 2
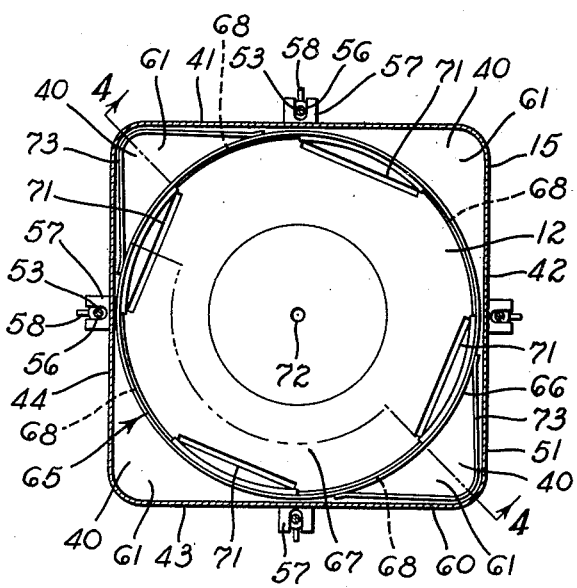
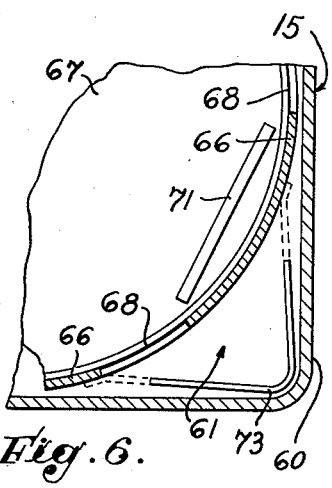
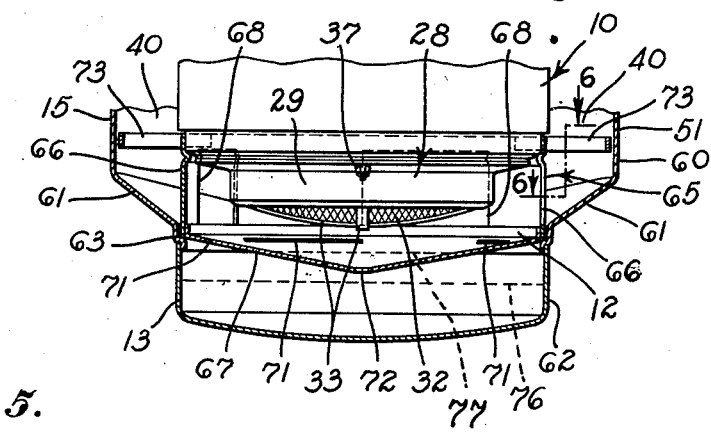
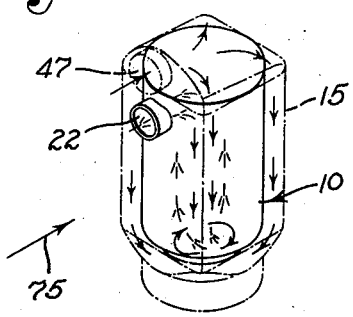
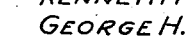
INVENTORS
KENNETH F. RUSSELL
GEORGE H. HOPKINS
BY
HARRIS, KIECH, FOSTER & HARRIS
FOR THE FIRM
ATTORNEYS.

Patented Sept. 11, 1945

2,384,699

UNITED STATES PATENT OFFICE 2,384,699

AIR CLEANER

Kenneth F. Russell and George H. Hopkins, Claremont, Calif., assignors to Herman H. Garner and Bess A. Garner, both of Claremont, Calif., as joint tenants Application January 23, 1943, Serial No. 473,416

6 Claims. (Cl. 183—15)

Our invention relates to means for filtering dust and sand from air, particularly devices for cleaning the air supplied to various mechanisms, such as internal combustion engines. The present disclosure is directed to the problem of designing such a filter for military use, especially for protecting the engines of military tanks, but is not to be regarded as limited to such use. For the purpose of disclosure, we elect to describe the invention as embodied in a wet filter of the type disclosed in various Garner patents, for example Nos. 1,881,049, 1,972,398, and 2,198,963. It will be apparent to those skilled in the art, however, that certain principles found herein may with advantage be embodied in other types of filters.

In air cleaners of the type disclosed in the Garner patents, a stream of air is drawn over a body of liquid and upward into a mass of filter material placed above the liquid body. The air stream is so directed as to form a vortex between the liquid and the filter mass. Some of the solid particles carried by the air are deposited centrifugally on the liquid-coated walls between the oil body and the filter mass, many are entrained by droplets or spray in the vortex and carried thereby either to the surrounding walls or to the filter medium, and the remaining free particles in the air stream are carried into and are entrapped by the liquid-impregnated filter mass. Droplets of liquid thrown against the walls surrounding the vortex are joined by liquid flowing downwardly from the filter mass so that the walls surrounding the vortex are continuously washed and solid particles are continuously flushed into the liquid body below. Thus the liquid, preferably an oil, not only serves to entrap solid particles but also serves to wash the filter material continuously and to convey the solid particles to a reservoir.

One of the more important of the objects of the present form of our invention is to design an air cleaner of the class described for service in an enclosed air stream with minimum obstruction of the air stream. A difficult problem in designning a filter for use in a military tank for desert warfare, for example, is to meet the space requirements imposed by the tank. Space requirements are a pressing consideration because the filter, in certain instances, must be placed in an enclosed air stream provided for air-cooled engines, and any restriction of the air stream by the filter necessarily interferes with the primary cooling function of the air stream. The filter design must be such that it neither unduly obstructs the cooling air stream nor creates undue turbulence to retard flow of the cooling air stream.

Since it is desirable for various reasons to employ an upright down-draft air cleaner, the absolute minimum profile for obstruction of the surrounding air stream is that of an upright cylinder enclosing the filter unit proper, a vortex space below the filter unit, and, finally, the liquid reservoir or oil cup below the vortex space. The problem is to provide down-draft air-intake passages and means to direct air tangentially into the vortex space with little or no addition to such minimum profile. In this regard the preferred form of our invention is characterized by the concept of enclosing the upright cylinder of the filter assembly in a casing defining therewith down-draft air passages, the casing having side walls substantially tangential to said cylinder, thereby to present to the air stream substantially the same profile as the cylindrical assembly.

Another object of our invention is to solve a second problem that must be met in designing the filter. This second problem is to provide adequate peripheral intake capacity in the vortex chamber within a desirable axial dimension of the chamber. The vortex action divides the upwardly moving oil into two portions, one of which portions is deposited centrifugally on the surrounding wall, the other of which portions is carried upward for circulation through the filtering medium. Since the ratio of the first portion to the second portion increases rapidly with increase in the axial dimension of the vortex chamber and since only a small percentage of the oil should be diverted from circulation through the filtering medium, the vortex chamber must be relatively short in axial or vertical extent. In the present form of our invention the solution to this second problem is tied in with the solution of the first-mentioned problem by dividing the intake among a plurality of peripheral openings, as will be apparent later.

A further object of our invention is to provide by simple structure an air intake arrangement that is conducive to highly efficient vortex action.

It is a still further object of our invention to provide an air cleaner of the described type that is of efficient, economical, and durable construction and is adapted to mass production.

Other objects and advantages of our invention will be apparent in our following detailed description, taken with the accompanying drawings.

In the drawings, which are to be regarded as illustrative only:

Fig. 3 is a transverse section taken approximately as indicated by the line 3—3 of Fig. 1;

Fig. 4 is a fragmentary section as indicated by the line 4—4 of Fig. 3;

Fig. 5 is a phantom perspective view of the device as installed in an enclosed air stream; and Fig. 6 is a fragmentary transverse section taken approximately as indicated by the line 6—6 of Fig. 4.

Figure 1:
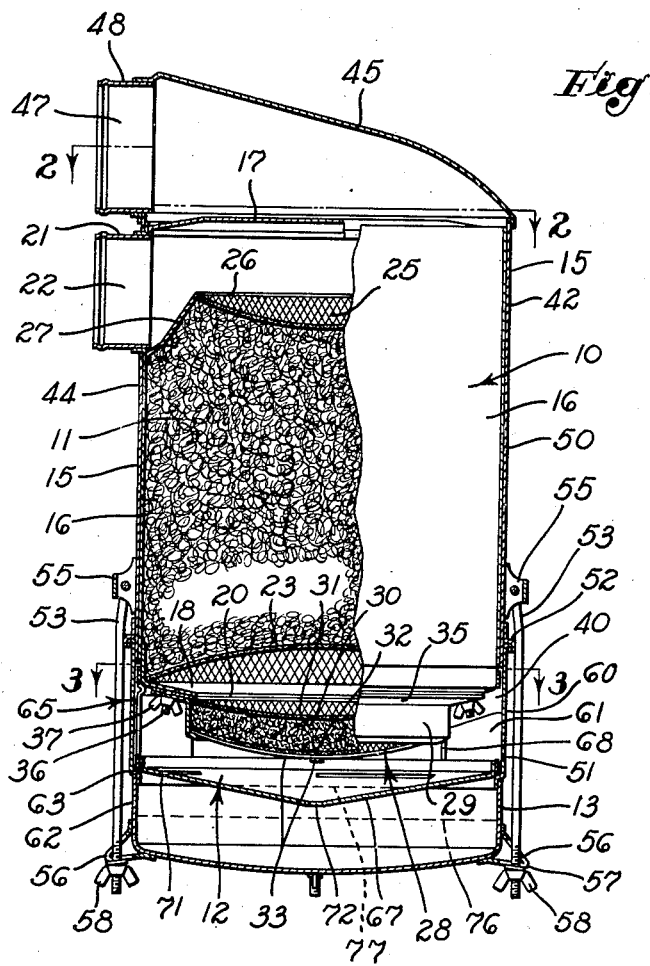
Fig. 1 is a longitudinal section partly in side elevation of a preferred form of our invention.
Figure 2:
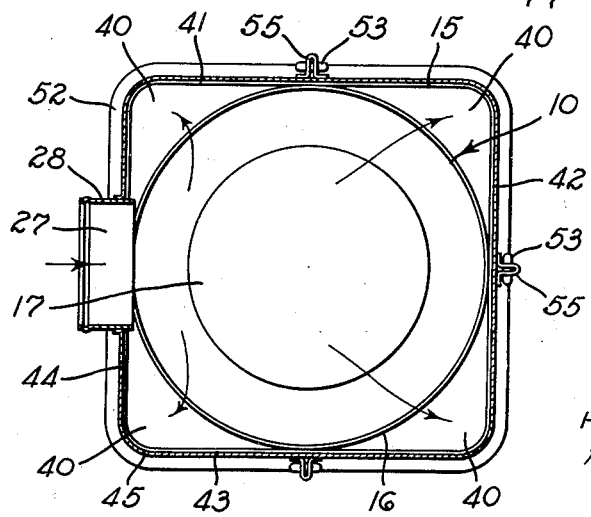
Fig. 2 is a transverse section taken on the irregular line 2—2 of Fig. 1.

The principal parts of the air cleaner shown in the drawings are a filter unit generally designated 10 of cylindrical configuration packed with a mass of filtering material 11, a vortex chamber 12, an oil cup 13, and a casing 15. The filter unit, vortex chamber, and oil cup may be termed collectively a filter assembly. The purpose of the casing 15 is primarily to provide down-draft air passages and to supply air to the filter assembly in such manner as to create the desired vortex in the vortex chamber 12.

The filter unit 10 has a cylindrical side wall 16, a top wall 17, and a dished bottom 18 formed with a large concentric opening 20. At an upper forward location, a collar 21 forms a discharge port 22 for the filter unit 10, the collar extending through the outer casing 15.

While any suitable filter material may be used for the filter unit, we prefer to employ a mass of interlinked elements in the form of short coils of fine wire as set forth in the copending Russell application Serial No. 349,090, entitled "Filter medium and method of production." In the present arrangement the filter material 11 is packed in a compact mass between a lower arched or concave screen 23 across the opening 20 and an upper concave screen 25, the upper concave screen spanning an upper opening 26 formed by a sheet metal deflector 27 of frusto-conical configuration.

In the preferred practice of our invention, the filter unit 10 is provided with a detachable pre-filter element 28, packed with a mass 30 of the same kind of filtering material as described above. The pre-filter element 28 is in the form of a short sheet metal cylinder 29 spanned by upper and lower coarse mesh screens 31 and 32, the lower screen being reinforced by a pair of diametrical metal bands 33. For releasable attachment to the filter unit 10, the pre-filter element 28 has an annular flange 35 with holes to receive studs 36 on the bottom wall 18 of the filter unit, the pre-filter element being held in place by wing nuts 37 on the studs.

The surrounding casing 15 may be of any suitable configuration providing side walls substantially tangential to the cylindrical filter unit 10 so that the casing presents to the surrounding air stream substantially the same profile as the filter assembly. Preferably the casing 15 is polygonal to define with the enclosed filter unit corner down-draft air passages. Thus, in the embodiment of the invention shown in the drawings the casing 15 is rectangular or square in cross section thereby to define with the filter unit four corner down-draft passages 40. It will be noted that the four side walls 41, 42, 43, and 44 are substantially tangential to the cylindrical side wall 16 of the enclosed filter unit 10, and that the two opposite side walls 41 and 43 are parallel, it being contemplated that these two side walls will lie in the direction of flow of the exterior air stream. The casing 15 extends above the top wall 17 of the filter unit 10 in the form of an intake hood 45 having an intake port 47 surrounded by a collar 48.

In the preferred form of our invention, the casing 15 is unitary with the oil cup 13 and is divided into two sections that are separable for access to the oil cup. The upper section 50 of the casing 15 is unitary with the filter unit 10 and the bottom edge of the upper section 50 terminates near the bottom of the filter unit. The lower section 51 of the casing 15 normally telescopes over the lower end of the upper section 50 and seats in a groove formed by a sheet metal flange 52 that is mounted on the exterior of the upper section 50. Any suitable means may be employed to hold the two sections together in a conveniently releasable manner. Thus we provide on the sides of the casing 15 suitable tie-bars 53 pivotally depending from brackets 55 mounted on the exterior of the upper section 50, the tie-bars normally extending into slots 56 in brackets 57 on the oil cup 13, the tie-bars being provided with wing nuts 58 for engagement with the lower brackets 57.

As best shown in Figs. 3 and 4, the lower section 51 of the casing 15 has a polygonal wall 60 continuing the polygonal configuration of the upper section 50, and has what may be termed inclined transition walls 61 at the corners leading to the cylindrical wall 62 of the oil cup 13. At the rim of the oil cup 13 the lower section 51 of the casing 15 forms an annular seat 63 for what may be termed a removable wall means 65.

The removable wall means 65 has a cylindrical wall comprising circumferentially arranged spaced wall portions 66 defining the vortex chamber 12 and has a bottom wall 67 connected to said portions 66 to serve as a barrier between the vortex chamber and the interior of the oil cup 13. As indicated in Figs. 3 and 6, the cylindrical wall 66 is cut away to provide four openings or ports 68 communicating with the four corner down-draft passages 40, the cylindrical wall thus being divided into four circumferential portions alternating with the four openings which are indicated in Fig. 3 by dotted lead lines from the numerals 68. The barrier wall 67 is provided with four down-flow slots 71, each being at the base of one of the circumferential portions of the wall 66. At the center of the barrier wall 67 is an up-flow aperture 72. To prevent relative rotation of the removable wall means 65, we may add a pair of diametrically placed metal bands 73 extending into opposite corners of the lower casing section 51, which bands serve as convenient handles for the removable wall means 65 when the removable wall means is outside of the casing.

It is to be noted that each of the circumferential openings 68 in the removable wall means 65 is of less width than the corresponding down-draft passage 40, being shown as approximately one-half the width of such passage 40, and is placed at one side of the corresponding down-draft passage so that air from the down-draft passage is directed into the vortex chamber 12 tangentially. Certain dual functions of structural elements will be apparent. Thus the four circumferential portions of the wall 66 serve both to entrap solid particles for delivery to the oil cup and to cooperate in directing air into the vortex chamber in a tangential manner. Again, the side walls 41 and 43 of the casing 15 not only conform to a minimum profile for obstruction to the external air stream but also serve in directing air tangentially into the vortex chamber.

The operation of the described air cleaner may be readily understood. Fig. 5 shows the air cleaner properly oriented to an external air stream indicated by the arrow 75. To prepare the air cleaner for operation, the oil cup 13 is filled to a level slightly above the central aperture 72 in the barrier 67, or approximately at the level of the lower edge of section 51 immediately below the annular seat 63 as indicated by dotted line 77. When the engine with which the air cleaner is associated is placed in operation so that the engine intake draws air through the air cleaner, air travels in the paths indicated by the arrows in Fig. 5.

Sweeping into the intake hood 45 through the intake port 47 the air divides for flow downward through the four corner down-draft passages 40 and then enters the vortex chamber 12 tangentially at four points through the openings 68 at the sides of the four passages 40 to create a vortex in the chamber 12 of the required effectiveness. As a result of the rotation of the air stream, a low pressure zone extends axially upward from the interior of the oil cup 13 through the barrier aperture 72 centrally through the vortex chamber 12 to the filter material in the filter unit 10. At the same time a peripheral high pressure zone extends from the peripheral regions of the vortex chamber downward through the slots 71 into the peripheral regions of the oil cup 13, air continuously flowing downward through the slots 71 and upward in a whirl through the central aperture 72 of the barrier 67.

Oil is entrained by the air, both because the vortex sweeps the central upper surface of the barrier 67 and because the vortex sweeps over the oil in the cup 13. As a result of such action on the part of the air stream, the oil in the cup drops to an operative level indicated, for example, by the dotted line 76 in Fig. 1. Of the total oil entrained by the air stream a minor portion is thrown centrifugally onto the circumferentially spaced wall portions 66 around the vortex chamber, while the major portion is carried upward into the mass of filtering material in the cylindrical filter unit 10, the major portion of the total oil at any given moment being interminged with the filtering material. While the pressure of the upwardly streaming air tends to hold a large quantity of oil in the mass of filtering material, nevertheless oil continuously flows downwardly through the filter mass to the bottom of the filter unit and drains from the central portion of the pre-filter 28. Oil draining from the pre-filter is swept by the rotating air to the walls 66 where it can drain to the barriers 67, then through the slots 71 into the oil cup 13. At the same time oil that is thrown centrifugally on the circumferentially spaced wall portions 66 around the vortex chamber likewise drains downwardly through the slots 71.

Since the incoming air stream tends to throw dust and sand particles against the peripheral areas of the barrier 67 and since the centrifugal action of the vortex tends to throw the particles against the surrounding circumferentially spaced portions of the wall 66 and since in either case the particles land on oil-drenched surfaces draining toward the oil cup 13, it is apparent that the major portion of the dust carried by the incoming air stream is immediately entrapped by flowing oil and carried directly into the bottom of the cup 13 where deposits of the entrained particles are gradually built up. The solid particles that are not immediately removed from the air stream become entrapped in the filtering material in the cylindrical filter unit 10 and tend eventually to reach the oil cup 13 by virtue of the cyclic flow of oil through the filter unit.

When operation ceases, oil gravitates to the idle level above the barrier aperture 72 with sufficient rapidity to adequately flush out the filter unit. When the deposit of solid particles in the bottom of the oil cup approaches the capacity of the oil body, the air cleaner may be serviced by merely loosening the tie-bars 53, removing the lower casing section 51, lifting out the removable wall means 65, and changing the oil. Servicing may be accomplished in a rapid and convenient manner.

Our description in specific detail of the preferred practice of our invention will suggest to those skilled in the art various changes and substitutions under our basic concept, and we reserve the right to all such modifications and departures that lie within the scope of our appended claims.

We claim as our invention:

1. An air cleaner of the class described for service in an enclosed air stream with minimum obstruction of the air stream, said cleaner having: an upright cylindrical filter unit containing a mass of filtering material, said unit being closed at the top with an upper discharge port and being open at the bottom; a casing attached to and surrounding said cylindrical unit, said casing having side walls substantially tangential to said cylindrical unit, thereby to present to said air stream substantially the same profile as said cylindrical unit, said casing defining with said cylindrical unit downward longitudinal passages for air intake, said casing extending below said unit to form an oil cup below the unit with an intervening vortex zone, said tangential side walls extending to said vortex zone, said casing being in separable parts for access to said oil cup; and removable wall means seated in said casing below said filter unit, said wall means including a transverse barrier between said oil cup and said vortex zone and a cylindrical wall in the vortex zone, said cylindrical wall having openings adjacent said tangential walls for air flow from said down passages tangentially into said vortex zone.

2. An air cleaner of the class described for service in an enclosed air stream with minimum obstruction of the air stream, said cleaner having: an upright cylindrical filter unit containing a mass of filtering material, said unit being closed at the top with an upper discharge port and being open at the bottom; a casing of polygonal cross-sectional configuration surrounding said cylindrical unit and forming therewith corner downdraft intake passages, said casing having side walls substantially tangential to said cylindrical unit, thereby to present to said air stream substantially the same profile as said cylindrical unit, said casing extending below said unit to form an oil cup below the unit with an intervening vortex zone, said side walls of the casing extending to said vortex zone; and removable wall means seated in said casing below said filter unit, said removable wall means including a transverse barrier between said oil cup and said vortex zone and including a cylindrical wall having openings adjacent said tangential walls for tangential air flow from said down passages into said vortex zone.

3. An air cleaner comprising: an upright casing providing flat vertical walls and having an air inlet at an upper portion thereof; an upright filter means in said casing containing filter material and having walls contacting portions of said flat walls to provide separate down draft corner passages between said casing and filter means; an oil cup in said casing below said filter means; removable wall means in said casing between said oil cup and said filter means, said removable wall means having spaced upstanding circumferentially disposed wall portions contacting said walls of said casing and enclosing a chamber, spaces between said wall portions passing air from said air inlet and down draft corner passages into said chamber, said removable wall means also having a transverse barrier below said wall portions, said barrier having a circumferentially disposed opening for passage of air into said oil cup and an opening for rise of air and oil therethrough into said chamber, said filter means being adapted for passage of air from said chamber into the lower end thereof; and outlet means for the passage of air from the upper end of the filter.

4. An air cleaner comprising: a casing of polygonal cross section providing flat vertical walls and having an air inlet at an upper portion thereof; a cylindrical filter unit disposed in said casing in tangential relation to the walls of said casing whereby said casing and said filter unit form corner down-draft passages connected with said air inlet; an oil cup on said casing below said filter unit; removable wall means positioned in said casing between said filter unit and said oil cup, said wall means comprising upstanding circumferentially disposed wall portions providing a chamber within them, said wall portions respectively engaging the walls of said polygonal casing and having spaces between them to pass air from said corner down-draft passages into said chamber, said wall means having a transverse barrier below said wall portions, said barrier having circumferentially arranged slots for passage of air from said chamber into said oil cup and passage for air and oil to rise from said oil cup into said chamber, each of said spaces between said wall portions being placed at one side of the corresponding down-draft passage, whereby air currents are directed tangentially into said chamber, said filter means being adapted to receive air from said chamber; and outlet means for the passage of air from said filter.

5. An air cleaner comprising: a casing of polygonal cross section providing flat vertical walls and having an air inlet adjacent its upper end; a cylindrical filter unit disposed within said casing and tangentially engaging inner walls of said casing, whereby separate vertical down draft passages are formed between said casing and said filter unit; a cylindrical oil cup having substantially the same diameter as that of the cylindrical filter unit, said oil cup being carried by the lower end of said polygonal casing, and the corner portions of said polygonal casing being inclined downward to conform with and join an upper portion of said cylindrical oil cup, said oil cup being spaced from the lower end of said filter unit; upstanding circumferentially disposed wall means between the upper portion of said oil cup and the lower portion of said filter unit, said wall means having substantially the same diameter as that of said cylindrical filter unit and having wall portions respectively engaging adjacent wall portions of said polygonal casing, thereby forming continuations of said down draft passages, said wall means being spaced to provide for passage of air from said down draft passage to said oil cup, said filter unit providing for passage of air upward therethrough; and an outlet means for the passage of air from the upper portion of said filter.

6. An air cleaner according to claim 5 including a transverse barrier wall spanning the upper portion of said oil cup below said circumferentially disposed wall means, said barrier having openings arranged for the passage of air into said oil cup, and said spaces between said wall portions being arranged at one side of the respective down draft passages to produce tangential air flow within said circumferentially disposed wall means.

KENNETH F. RUSSELL.
GEORGE H. HOPKINS.